United States Patent

Houghton et al.

[11] Patent Number: 5,955,993
[45] Date of Patent: Sep. 21, 1999

[54] DETECTION OF SPREAD SPECTRUM SIGNALS

[75] Inventors: Andrew Warren Houghton; Christopher Deal Reeve, both of Plymouth, United Kingdom

[73] Assignee: The Secretary of State for Defense in Her Britannic Majesty's Government of the United Kingdom of Great Britain and Northern Ireland, Farnborough, United Kingdom

[21] Appl. No.: 08/809,097
[22] PCT Filed: Sep. 20, 1995
[86] PCT No.: PCT/GB95/02222
§ 371 Date: Mar. 19, 1997
§ 102(e) Date: Mar. 19, 1997
[87] PCT Pub. No.: WO96/09558
PCT Pub. Date: Mar. 28, 1996

[30] Foreign Application Priority Data

Sep. 22, 1994 [GB] United Kingdom .................. 9419106

[51] Int. Cl.⁶ .................. G01S 5/02; G02F 1/33
[52] U.S. Cl. .................. 342/417; 342/424; 359/306; 708/816
[58] Field of Search .................. 342/387, 432, 342/424, 189, 439, 444, 417; 375/200; 359/306; 708/816

[56] References Cited

U.S. PATENT DOCUMENTS

| | | | |
|---|---|---|---|
| 2,962,714 | 11/1960 | Meixell et al. | 342/378 |
| 4,225,938 | 9/1980 | Turpin | 364/822 |
| 4,297,704 | 10/1981 | Marom et al. | 342/417 |

(List continued on next page.)

FOREIGN PATENT DOCUMENTS 2277853   5/1993   United Kingdom .
WO 86/03014   A1   11/1985   WIPO .
WO 85/05189   A1   5/1986   WIPO .

OTHER PUBLICATIONS

Richard G. Wiley, "Electronic Intelligence: The Interception of Radar Signals", 1985, pp. 233–238.
IEEE Transaction on Microwave Theory and Techniques, Jun. 1994, USA, vol. 42, No. 6, ISSN 0018–9480, pp. 951–955, Soares S. et al, "A wide band tracking delay for radio astronomy".
RADAR 92 pp. 180 to 183 (133 Conference Publication No. 365): B Bashegi: A radar countermeasures receiver.

*Primary Examiner*—Gregory C. Issing
*Attorney, Agent, or Firm*—Nixon & Vanderhye P.C.

[57] ABSTRACT

A spread spectrum signal detection system comprising two spatially separated receivers, a correlator, such as a time integrating correlator employing acousto-optic cells, which is connected to the outputs from the two receivers to produce a signal representative of the cross correlation function of the two spread spectrum signals, a filter arranged to transmit only the central portion of the cross correlation function and a signal processor to produce the cross spectral density and thereby determine the presence of the spread spectrum signal. The direction of arrival of the spread spectrum signal can be determined by measurement of the angle of the phase slope of the cross spectral density. The acousto-optic cells can be Bragg cells. The output signal from one of the receivers can be applied to a first Bragg cell arranged to point modulate light from a laser light source, the output then being transmitted through a beam expander to a second Bragg cell to which the output signal from the second receiver can be applied, the output from the second Bragg cell then being detected by a photo-detector array. The output from the second Bragg cell can be spatially filtered by providing adjustable imaging optics arranged such that only light corresponding to the central portion of the cross correlation function is transmitted. The processor can be arranged to demodulate the signals to produce data corresponding to the central portion of the cross correlation function and to Fourier transform the data to produce the cross spectral density.

14 Claims, 4 Drawing Sheets

U.S. PATENT DOCUMENTS

| | | | |
|---|---|---|---|
| 4,326,778 | 4/1982 | Berg et al. | 359/306 |
| 4,468,093 | 8/1984 | Brown | 359/310 |
| 4,558,925 | 12/1985 | Casseday et al. | 359/306 |
| 4,652,817 | 3/1987 | Yarborough et al. | 324/77 K |
| 4,845,502 | 7/1989 | Carr et al. | 342/430 |
| 4,847,862 | 7/1989 | Braisted et al. | |
| 5,016,256 | 5/1991 | Stewart. | |
| 5,121,248 | 6/1992 | Mohon et al. | 359/306 |
| 5,296,861 | 3/1994 | Knight | 342/357 |

DETECTION OF SPREAD SPECTRUM SIGNALS

The invention relates to the detection of low power spread spectrum signals as used, for example, in many modern radars and in particular though not exclusively to direction finders using the cross correlation of signals received from two spatially separated receivers.

Many modern radars use spread spectrum techniques. This enables them to achieve good range resolution with low power outputs, and it also gives them LPI (Low Probability of Intercept) properties. The radar receiver, with its matched filter, can make use of the full processing gain available from a pulse of CW signal with large time-bandwidth product. An ESM receiver can not normally take advantage of this potential processing gain, and is additionally hampered by having to have a relatively wide bandwidth with a consequent noise penalty.

If a system attempting to detect and locate spread spectrum signals uses two spatially separated receivers and cross correlates the two received signals, it can achieve much of the processing gain available to the matched filter receiver. The two signals will contain both antenna noise and internal receiver noise. The internal noise in the two receivers will be independent and will not correlate. Much of the two sets of antenna noise comes from the same sources. However, if these sources are spatially distributed then the signals from these sources arrive at the two antennas with a distribution of time delays, and the antenna noise signals are effectively uncorrelated. Any fixed signal source (emitting a spread spectrum signal) will, however, emit a signal that will be present in both receiver inputs with a single fixed time delay. The cross correlation function of the two receiver outputs will contain the autocorrelation function of the signal coming from any fixed source, shifted along the time axis according to the time difference of arrival at the antennas. It will also contain two cross correlations of the signal in one receiver with the noise in the other, and the cross correlation of the two sets of noise. For large input signal to noise ratios the noise-noise cross correlation will be insignificant and the correlator output will effectively contain the signal autocorrelation function plus the two signal-noise cross correlations.

However, we are generally more interested in the case where the input signal to noise ratio is small. The noise-noise cross correlation will then dominate and the system will perform much worse than the matched filter, unless we can find some other way of rejecting a significant portion of the noise. This is possible. If the noise signals in the two receivers are indeed uncorrelated, then the signal-noise and noise-noise cross correlations will simply be noise signals spread, more or less uniformly, over the full length of the cross correlation function. However, the signal autocorrelation function will, for a spread spectrum signal be concentrated in the centre. If we take just the central portion of the cross correlation function, therefore, we can reject most of the noise energy present. This does not help us if we are concerned with making measurements, such as threshold detection, on the time domain cross correlation function.

It should also be noted that, because it has no a-priori timing information, the ESM system cannot integrate over several pulses in the way that the radar can.

If we wish to direction find on a fixed signal source, we can obtain the time difference of arrival at the antennas by direct measurements on the cross correlation function. However the resolution of this is limited by the width of the main lobe of the signal auto correlation function, which is approximately the inverse of the signal bandwidth. For example, a system using a baseline of 50 m to direction find on a signal of bandwidth 10 MHz would have a bearing resolution of about 34° at best. Such direct measurement of the position of the autocorrelation function using threshold detection is, of course, very crude and fails to make use of the phase information present in the cross correlation function.

The object of the invention is to provide a cross correlation receiver detection system which is capable of providing improved detection and substantially greater positional accuracy than hitherto possible.

The invention provides a spread spectrum signal detection system comprising:

two spatially separated receivers for detecting the spread spectrum signal;

a correlator having first and second inputs connected to the outputs from the two receivers to produce at an output thereof a signal representative of the cross correlation function of the spread spectrum signals received by the two receivers;

a filter having an input connected to the output of the correlator arranged to transmit to an output thereof only the central portion of the cross correlation function; and a signal processor connected to the output from the filter to produce the cross spectral density and thereby determine the presence of the spread spectrum signal.

In the preferred arrangement of the invention the direction of arrival of the spread spectrum signal at the detection system can be determined by measurement of the angle of the phase slope of the cross spectral density.

In the preferred arrangement the correlator is a time integrating correlator employing acousto-optic cells. The acousto-optic cells are preferably Bragg cells. In a convenient arrangement the output signal from one of the receivers is applied to a first Bragg cell arranged to point modulate light from a laser light source, the modulated light output from the first Bragg cell is then transmitted through a beam expander to a second Bragg cell to which the output signal from the second receiver is applied, the modulated output light from the second Bragg cell then being detected by a photo-detector array.

Preferably, in order to reduce the computational demands on the system, the modulated light output from the second Bragg cell is spatially filtered by providing imaging optics arranged such that only light corresponding to the central portion of the cross correlation function is transmitted. Advantageously there is provided means to adjust the imaging optics to ensure that only the light corresponding to the central portion of the cross correlation function is transmitted through the spatial filter.

The output signals from each diode of the photo-diode array are preferably connected to a digital signal processor arranged firstly to demodulate the signals to produce data corresponding to the central portion of the cross correlation function and secondly to Fourier transform the data to produce the cross spectral density.

The Fourier transform is conveniently done by means of a fast Fourier transformer (FFT).

The detection system is advantageously arranged such that a peak measurement in the cross spectral density leads to an output signal indicating presence of a target signal.

For target bearing information the DSP is arranged such that the angle of the phase slope of the cross spectral data is made. Preferably a least squares method is applied to determine the phase slope.

The invention will now be described by way of example with reference to the accompanying Drawings of which:

Figure 1:
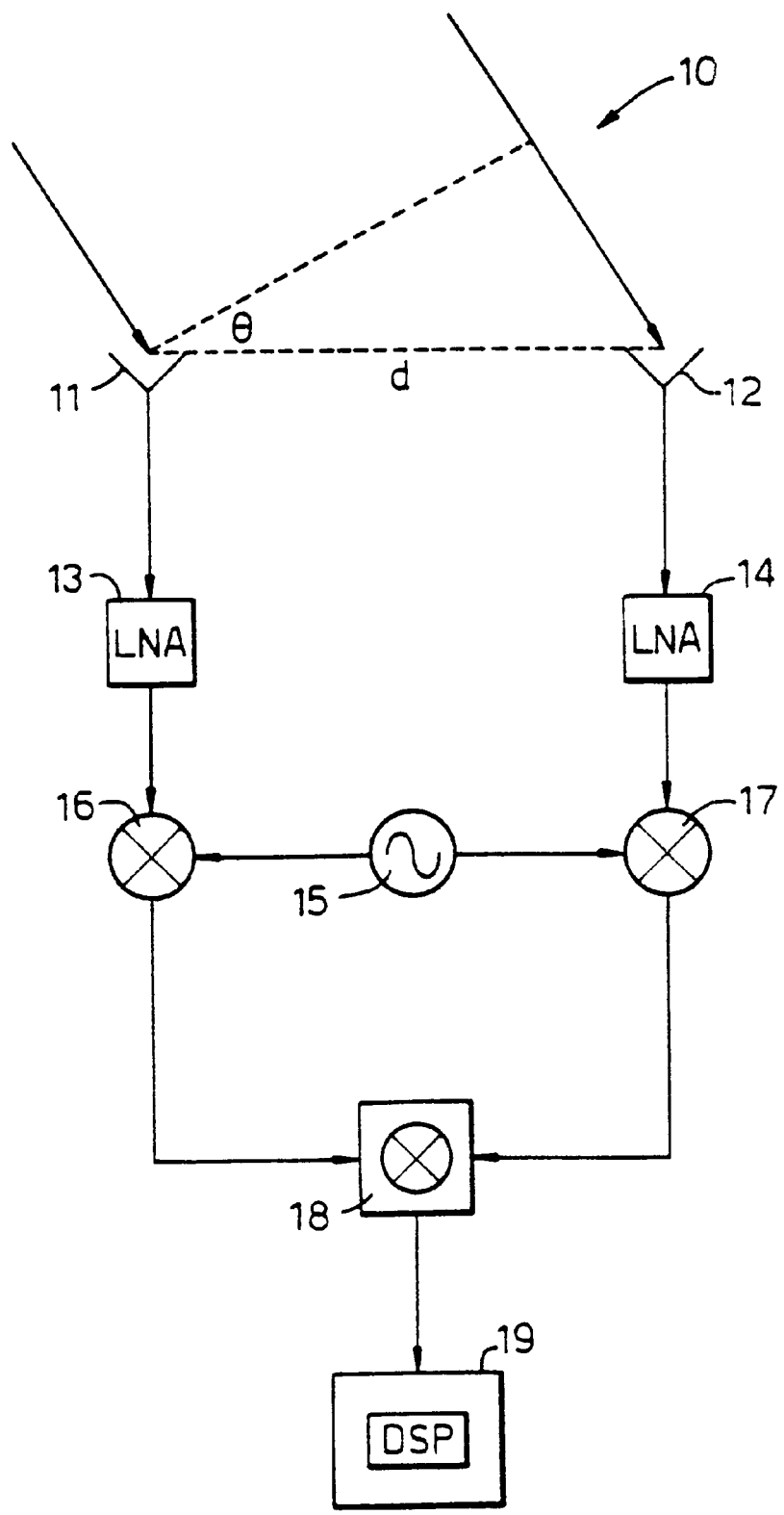
FIG. 1 is a block diagram of a two receiver correlation signal detection and direction finder.

FIG. 1 illustrates a direction finder in which a weak spread spectrum signal 10 arrives at two detectors from an angle 0. The detectors comprise antennas 11, 12, spatially separated by a distance d, and respective low noise RF amplifiers 13, 14. The output signals from the amplifiers 13, 14 are mixed with the output signal from a stable low noise oscillator 15 in mixers 16, 17 and the output signals from the mixers are cross-correlated in cross correlator 18. The output signal from the cross correlator 18 is then connected to a digital signal processor (DSP) 19. When the cross correlation of the outputs of the 2 receivers is formed, the signal-signal cross correlation, for a spread spectrum signal 10, is concentrated almost totally in small regions in the centre of the cross correlation function while noise terms are spread out over the full range of the total cross correlation function. Once the spread spectrum signal has been detected the angle of arrival 0 can be determined if the time difference of arrival at the two receivers can be obtained. This time difference is manifested in the cross correlation function as a shift in the position of the correlation peak from the centre. Unfortunately this shift generally cannot be measured with sufficient accuracy to be useful.

A time shift in the time domain cross correlation function is equivalent to a linear phase slope in the frequency domain cross spectral density. Thus, if the complex cross spectral density is stored digitally then this phase slope can be extracted to give the angle of arrival 0. First, the part of the cross spectral density containing the signal must be established. This is done by threshold detection of the magnitude. Second, the phase terms need to be unwrapped by means of an appropriate algorithm which adds or subtracts 2 pi as appropriate when a sudden phase change is detected between successive stored points. The inventor has shown that the unwrapping algorithm can fail, particularly for weak signals, if the cross spectral density is not time domain filtered.

To sample the signals from the two receivers and perform the necessary cross correlations digitally in real time may not be feasible, especially if we wish to design a system with large channel bandwidths and long sample lengths. For example: a channel bandwidth of 1 GHz and a sample length of 50 $\mu$s would require analogue to digital conversion at a sampling frequency of 2 GHz and data sets of 50,000 points.

Acousto-optic correlators may provide the answer to the problem of forming the initial cross correlation function. The fact that we then only want to sample a relatively small centre portion of the cross correlation function is very convenient since this means that the number of data points we have to extract for further processing is very much reduced.

Figure 2:
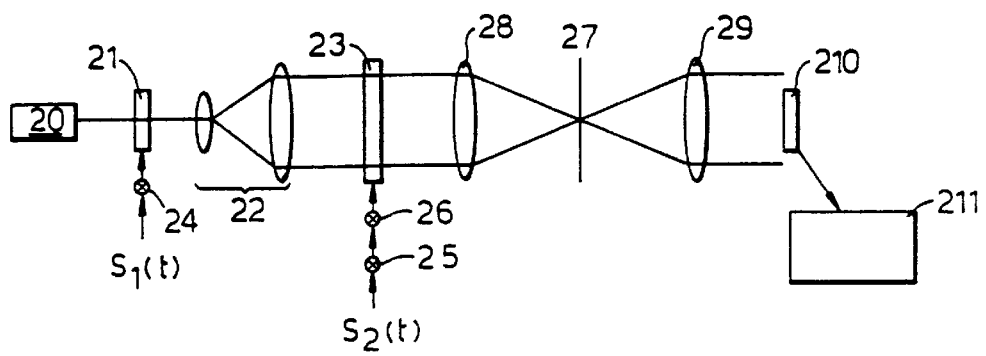
FIG. 2 shows a practical time domain correlator using Bragg cells.

FIG. 2 shows a time integrating correlator implementation for use as the cross correlator 18 in FIG. 1. This arrangement of correlator is described by Vanderlugt "Optical Signal Processing", Wiley Interscience, 1992 pp520–526. A laser light source 20 is shown incident on a first Bragg cell 21, driven by a first ($S_1(t)$) of the two signals to be correlated. This produces point modulation of the laser light which is expanded by a beam expander 22 to illuminate a second Bragg cell 23 driven by the second signal $S_2(t)$. Both signals $S_1(t)$ and $S_2(t)$ have a bias 24, 25 added before connection to the respective Bragg cells. In addition the second signal $S_2(t)$ is modulated by an oscillator signal of frequency $W_c$ in a mixer 26. The modulated light from the second Bragg cell 23 is then transmitted through a spatial filter 27, situated between converging lenses 28, 29, to a photodetector array 210. The output signals from the array 210 are then connected to a DSP 211. In the DSP 211 the Fourier transform, obtained by a fast Fourier transform processor (FFT), of the truncated cross correlation function is used to produce the time domain filtered cross spectral density. A least squares or other suitable technique is then used to determine the phase slope of the cross spectral density and hence the direction of arrival of the detected signal.

Vanderlugt shows that the time integrated light intensity at the plane of the photodetector array contains a spatially invariant term which is proportional to the integration time and the cross correlation function of the two input signals imposed as double sideband suppressed carrier modulation of a spatial carrier. This correlator is ideal for the required process of windowing the centre portion of the cross correlation function. The spatial dimensions of the cross correlation function are controlled by adjustment of the imaging optics so that the required centre portion falls on the photodetector array. The spatial function is then sampled by the array and all further processing performed digitally, including demodulating the spatial signal to recover the correlation function from the carrier.

This arrangement takes advantage of the speed of optical signal processing for the correlation and the flexibility of digital signal processing once the sets of data points has been reduced to manageable numbers.

In the proposed implementation of the FIG. 2 arrangement a Fairchild 2048 element CCD linescan camera is used, controlled by and delivering its data to, a TMS320C30 based framegrabber and digital signal processing board mounted in a host PC.

In this arrangement the limited dynamic range of the acousto-optic Bragg cells need not be a problem. Where the system is intended to look for signals below the noise level, the system would be set up with RF and IF gains such that the standard deviation of the noise is approximately one third of the amplitude range of the correlator inputs. Short high power pulses will be severely clipped. This goes some way towards eliminating the non LPI pulses that would be detected by a conventional system, although they would of course be better excluded by the use of notch filters to block known signals.

Simulation of this system has shown that it should be highly effective against LPI radars. By use of the time domain filtered cross spectral density, such a system should, in addition to detecting spread spectrum signals at power levels well below the sensitivities of current ESM systems, be able to direction find on such signals.

One type of radar having LPI properties is the FMCW radar, an example of which is the PILOT navigation radar which operates at about 9 GHz. This is described in Beasley PDL and Stove AG: "PILOT—an example of advanced FMCW techniques", IEE Colloq, an "High time-bandwidth product waveforms in radar and sonar", IEE Digest No 093, 1991. PILOT employs a sawtooth frequency sweep of 50 MHz with a time period of 1 ms within a bandwidth of 1 GHz. If a cross correlating detection system uses a sample time of 50 µs then it can only 'see' a frequency sweep of 2.5 MHz. Using a time domain correlator as proposed in this invention, it can be shown that the time domain filtered Cross Spectral Density gives a significantly higher output signal to noise ratio than the cross correlation function. Hence use of the cross spectral density gives increased detectability of the FMCW signal at lower powers. In addition, detection improves with longer integration time.

The inventor has shown that the main peak of the autocorrelation function of an LPI radar pulse is very narrow, the time shift between the two inputs to the receivers is also small, and the noise in the cross correlation function is spread across the whole width of the function. Therefore much of the noise can be eliminated by simply rejecting all but the centre portion of the cross correlation function by use of the spatial filter 27. Then, taking the Fourier transform of this windowed function produces the time domain filtered cross spectral density. It has further been shown that for short samples or systems in which the noise bandwidth is much greater than the bandwidth of the signal within the sample, the time domain filtered cross spectral density can have a significantly higher signal to noise ratio than the cross correlation function. Simulation has demonstrated that measurement of the phase slope of the relevant part of the time domain filtered cross spectral density can give accurate direction finding. This direction finding is especially accurate if a number of successive cross correlation functions are coherently summed, simulating the effect of a long sample length, before formation of the time domain filtered cross spectral density.

If a radar uses long spread spectrum pulses, then an ESM system with no processing gain will have no range advantage, even if it uses a channellised receiver with a large number of narrow channels. A crystal video receiver will be much more sensitive but will still not achieve a useful range advantage over an LPI radar, even when it has a-priori knowledge of the pulse length, allowing it to optimise the video bandwidth. It has been shown that a dual receiver cross correlating ESM system, which requires virtually no a-priori information, will always perform significantly better than a crystal video receiver. If the ESM system noise bandwidth is more than 12 times greater than the bandwidth of the signal contained within a sample, then use of the time domain filtered cross spectral density can offer greater sensitivity. Use of this cross spectral density also enables discrimination between signals of different frequencies within the same RF channel and extremely accurate direction finding.

A simulation model has been developed to illustrate the invention.

The model parameters were: a receiver noise bandwidth of 80 MHz, an FMCW signal sweeping up through a bandwidth of 10 MHz in 0.5 ms, a receiver output signal to noise ratio of —13 dB, and an antenna separation of 50 m. Ten cross correlations were performed on successive 50 µs samples and summed. Although the resulting cross correlation function has a very low signal to noise ratio, when viewed in the time domain, direction finding using the phase slope of the time domain filtered CSD gave a direction of arrival measurement, on a source at 30° from the two element array broadside, with an error of less than 0.5°. The following Figures demonstrate the process.

Figure 3:
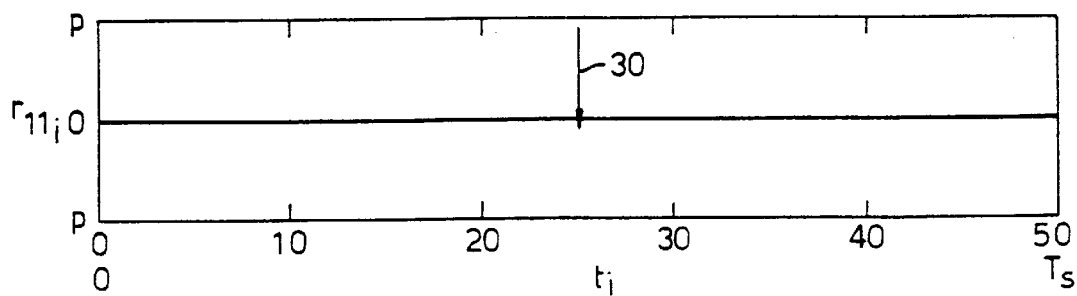
FIG. 3 shows an autocorrelation function of one receiver output.

FIG. 3 shows the autocorrelation function of one of the receiver outputs for comparison with the cross correlation function. This autocorrelation function is clearly dominated by the very large noise autocorrelation peak 30.

Figure 4:
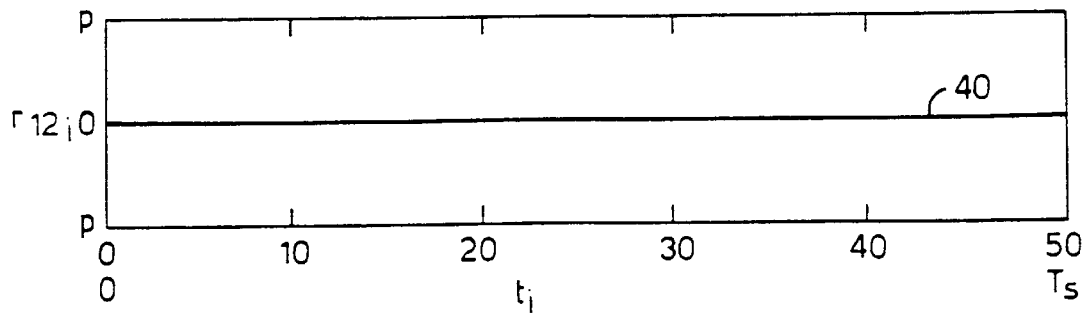
FIG. 4 shows the cross correlation of the outputs from the two receivers.

FIG. 4 shows the cross correlation of the two receiver outputs, on the same scale as FIG. 3. The components 40 due to the noise are now spread over the full width of the function.

Figure 5:
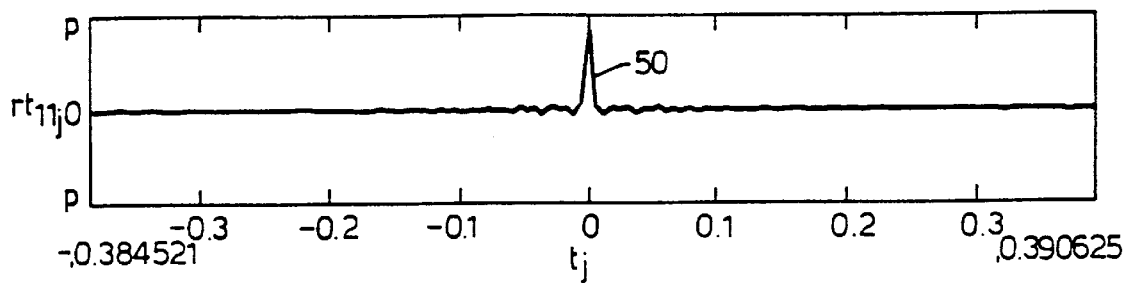
FIGS. 5 and 6 show the effect of zooming in on the centres of the functions shown in FIGS. 3 and 4 respectively.
Figure 6:
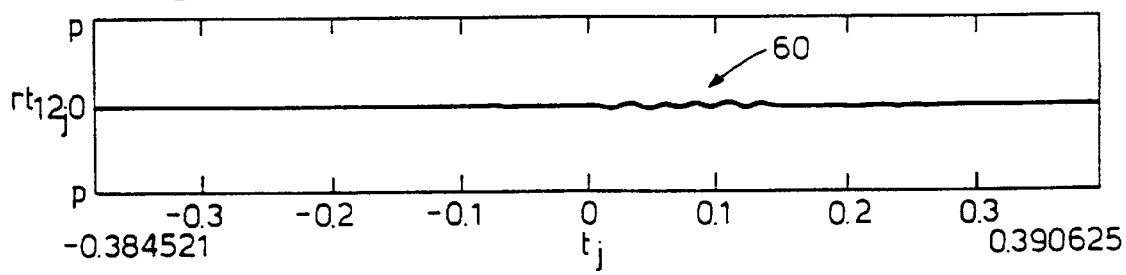

FIGS. 5 and 6 show the result of zooming in on the centres of the autocorrelation function shown in FIG. 3 and the cross correlation function shown in FIG. 4 by a factor of 64. 50 is the autocorrelation peak. While it is apparent that the central lobe 60 of the cross correlation function does contain a time shift, estimation of this shift directly by threshold detection would give very poor results.

Figure 7:
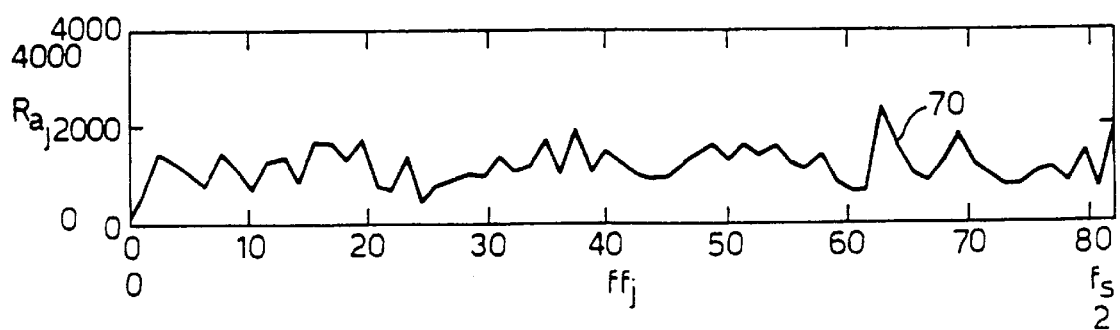
FIG. 7 shows the power spectral density corresponding to the autocorrelation function shown in FIG. 3.

FIG. 7 shows the power spectral density 70 obtained simply by taking the Fourier transform of the autocorrelation function shown in FIG. 3. This is basically the same as a straight forward FFT analysis of one receiver output. It is clearly not very useful.

Figure 8:
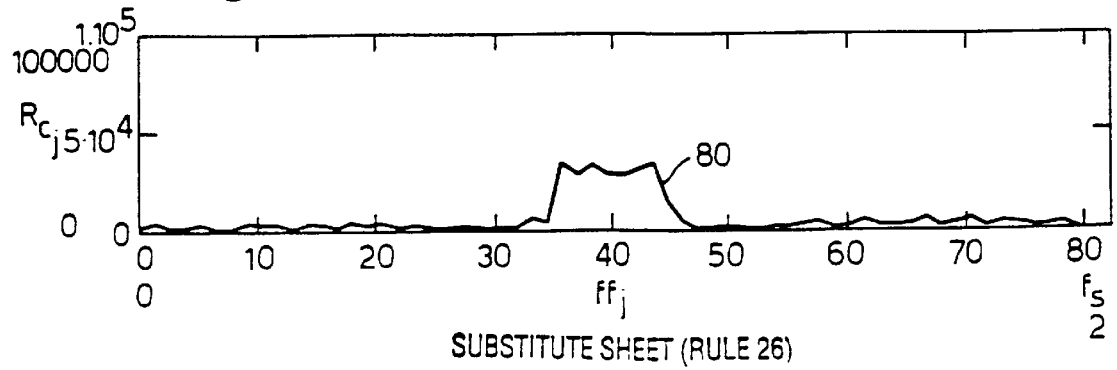
FIG. 8 shows the time domain filtered cross spectral density obtained from the FIG. 6 data.

FIG. 8 shows the magnitude of the time domain filtered cross spectral density obtained by taking the fast Fourier transform (FFT) of the truncated cross correlation function shown in FIG. 6. The 10 MHz bandwidth signal 80 now shows up very clearly.

Figure 9:
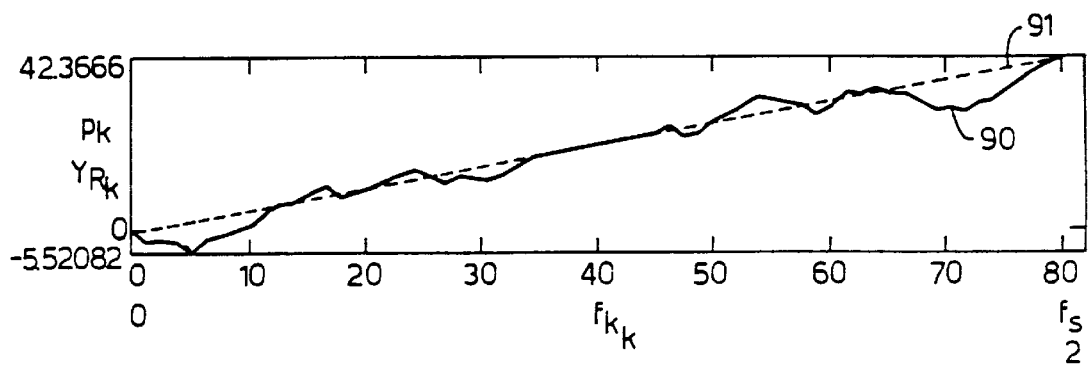
FIG. 9 shows the phase slope of the FIG. 8 data as used to determine the direction of arrival of a received signal.

FIG. 9 shows the unwrapped phase 90 of the time domain filtered CSD, with a straight line 91 fitted to the section within the signal band. From the slope of this straight line we can calculate the time shift in the cross correlation function and hence the direction of arrival of the signal. The actual time delay between the two signals in the model correspond to a direction of arrival of 30°. The direction of arrival calculated from the slope of the straight line in FIG. 9 was 30.3°.

Although other types of acousto-optic correlator may be used, such as a space integrating correlator or a joint transform correlator, the time integrating correlator described is particularly beneficial for real time data processing using only the centre portion of the cross correlation function.

We claim:

1. A spread spectrum signal detection system comprising:
   a) two spatially separated receivers for detecting the spread spectrum signal;
   b) a correlator having first and second inputs connected to the outputs from the two receivers to produce at an output thereof a signal representative of the cross correlation function of the spread spectrum signals received by the two receivers;
   c) a filter having an input connected to the output of the correlator arranged to transmit to an output thereof only the central portion of the cross correlation function; and
   d) a signal processor connected to the output from the filter to produce the cross spectral density and thereby determine the presence of the spread spectrum signal.

2. A spread spectrum signal detection system as claimed in claim 1 wherein the direction of arrival of the spread spectrum signal at the detection system is determined by measurement of the angle of the phase slope of the cross spectral density.

3. A spread spectrum signal detection system as claimed in claim 1 wherein the correlator is a time integrating correlator employing acousto-optic cells.

4. A spread spectrum signal detection system as claimed in claim 3 wherein the acousto-optic cells are Bragg cells.

5. A spread spectrum signal detection system as claimed in claim 4 wherein the output signal from one of the receivers is applied to a first Bragg cell arranged to point modulate light from a laser light source, the modulated light output from the first Bragg cell is then transmitted through a beam expander to a second Bragg cell to which the output signal from the second receiver is applied, the modulated output light from the second Bragg cell then being detected by a photo-detector array.

6. A spread spectrum signal detection system as claimed in claim 5 the modulated light output from the second Bragg cell is spatially filtered by providing imaging optics arranged such that only light corresponding to the central portion of the cross correlation function is transmitted in order to reduce the computational demands on the system.

7. A spread spectrum signal detection system as claimed in claim 6 wherein there is provided means to adjust the imaging optics to ensure that only the light corresponding to the central portion of the cross correlation function is transmitted through the spatial filter.

8. A spread spectrum signal detection system as claimed in claim 5 wherein the output signals from each detector of the photo-detector array are connected to a digital signal processor (DSP) arranged firstly to demodulate the signals to produce data corresponding to the central portion of the cross correlation function and secondly to Fourier transform the data to produce the cross spectral density.

9. A spread spectrum signal detection system as claimed in claim 8 wherein the Fourier transform is done by means of a fast Fourier transformer (FFT).

10. A spread spectrum signal detection system as claimed in claim 1 wherein the detection system is arranged such that a peak measurement in the cross spectral density leads to an output signal indicating presence of a target signal.

11. A spread spectrum signal detection system as claimed in claim 8 wherein for target bearing information the DSP is arranged such that the angle of the phase slope of the cross spectral data is determined.

12. A spread spectrum signal detection system as claimed in claim 11 wherein a least squares method is applied to determine the phase slope.

13. A method of detecting a spread spectrum signal, said method comprising the steps of:

receiving a spread spectrum signal to be detected with two spatially separated receivers and providing respective receiver outputs;

correlating the receiver outputs and providing a signal representative of the cross correlation function of the spread spectrum signal received by the two receivers;

filtering the signal representative of the cross corrrelation function and providing an output comprised of only the central portion of the cross correlation function; and using a signal processor responsive to the central portion output to produce a cross spectral density and thereby provide an indication of the presence of said spread spectrum signal.

14. A method of detecting a spread spectrum signal in accordance with claim 13, including the further step of measuring an angle of the phase slope of the cross spectral density to determine the direction of arrival of the spread spectrum signal.

* * * * *